(12) United States Patent
Terada et al.

(10) Patent No.: US 7,865,438 B2
(45) Date of Patent: Jan. 4, 2011

(54) ELECTRONIC VALUE EXCHANGE METHOD, USER DEVICE, AND THIRD-PARTY DEVICE

(75) Inventors: Masayuki Terada, Yokosuka (JP);
Kensaku Mori, Yokohama (JP);
Kazuhiko Ishii, Yokohama (JP);
Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1322 days.

(21) Appl. No.: 11/371,106

(22) Filed: Mar. 9, 2006

(65) Prior Publication Data
US 2006/0259430 A1 Nov. 16, 2006

(30) Foreign Application Priority Data
Mar. 14, 2005 (JP) ............................ P2005-071690

(51) Int. Cl.
*G06Q 20/00* (2006.01)
*G06F 17/60* (2006.01)
(52) U.S. Cl. .......................................... 705/44; 705/41
(58) Field of Classification Search .................... 705/51, 705/41, 44
See application file for complete search history.

(56) References Cited

U.S. PATENT DOCUMENTS

| | | | | |
|---|---|---|---|---|
| 6,047,270 A * | 4/2000 | Joao et al. | ...................... | 705/44 |
| 6,097,817 A * | 8/2000 | Bilgic et al. | ................. | 380/270 |
| 6,208,627 B1 * | 3/2001 | Menon et al. | ................ | 370/328 |
| 6,526,026 B1 * | 2/2003 | Menon | ........................ | 370/310 |
| 6,581,191 B1 * | 6/2003 | Schubert et al. | ................. | 716/4 |
| 6,618,839 B1 * | 9/2003 | Beardslee et al. | ............... | 716/4 |
| 6,823,497 B2 * | 11/2004 | Schubert et al. | ................. | 716/4 |
| 7,072,818 B1 * | 7/2006 | Beardslee et al. | ............. | 703/14 |
| 2001/0034771 A1 * | 10/2001 | Hutsch et al. | ................ | 709/217 |
| 2001/0036167 A1 * | 11/2001 | Menon et al. | ................ | 370/337 |

(Continued)

FOREIGN PATENT DOCUMENTS

JP 3390016 1/2003

(Continued)

OTHER PUBLICATIONS

Henning Pagnia, et al. "Fair Exchange", The Computer Journal, vol. 46, No. 1, Oxford University Press, Jan. 2003, 22 pages.

(Continued)

*Primary Examiner*—Evens J Augustin
(74) *Attorney, Agent, or Firm*—Oblon, Spivak, McClelland, Maier & Neustadt, L.L.P.

(57) ABSTRACT

A user device uses, instead of agreement information, only second session information contained in the agreement information, to generate an electronic signature for information containing the session information and information indicating an abort request, and outputs abort request information containing the session information, the information indicating the abort request, and the electronic signature, whereby transmission/reception can be performed without unnecessary information. Similarly, it may be configured to use only the second session information to generate an electronic signature for information containing the session information and information indicating a commitment request, and to output commitment request information containing the electronic signature. Since a third-party device defines a third session state as abort in correspondence to the second session information, it is able to manage states while appropriately discriminating a plurality of concurrent electronic value exchanges.

14 Claims, 11 Drawing Sheets

U.S. PATENT DOCUMENTS

| | | | |
|---|---|---|---|
| 2001/0049731 A1* | 12/2001 | Kuusinen et al. | 709/223 |
| 2001/0051920 A1* | 12/2001 | Joao et al. | 705/41 |
| 2003/0028484 A1* | 2/2003 | Boylan et al. | 705/40 |
| 2003/0033522 A1* | 2/2003 | Bilgic et al. | 713/168 |
| 2003/0070080 A1 | 4/2003 | Rosen | |
| 2003/0144958 A1* | 7/2003 | Liang et al. | 705/51 |
| 2003/0225691 A1 | 12/2003 | Ruellan et al. | |
| 2004/0078332 A1* | 4/2004 | Ferguson et al. | 705/41 |
| 2004/0103014 A1* | 5/2004 | Teegan et al. | 705/8 |
| 2005/0193280 A1* | 9/2005 | Schubert et al. | 714/47 |

FOREIGN PATENT DOCUMENTS

| | | |
|---|---|---|
| JP | 2004-246855 | 9/2004 |
| JP | 2004-341643 | 12/2004 |
| KR | 2000-0038184 | 7/2000 |
| KR | 2001-0057169 | 7/2001 |
| KR | 2002-0068722 | 8/2002 |
| KR | 10-2005-0042694 | 5/2005 |

OTHER PUBLICATIONS

N. Asokan "Fairness in Electronic Commerce", Waterloo University, 1998, 179 pages.

Matthias Schunter "Optimistic Fair Exchange", University of Saarland, 2000, 258 pages.

Session Management/ Introduction to PHP, the Internet URL:http//www.scollabo.com/banban/php/php_14.html, [on line] Apr. 1, 2004, Aug. 9, 2006 Searched, 3 pages (with English Translation).

* cited by examiner

Fig.11

| THIRD SESSION STATE | SECOND SESSION INFORMATION |
|---|---|
| ABORT | S2-1 |
| COMPLETE | S2-2 |
| COMPLETE | S2-3 |

ELECTRONIC VALUE EXCHANGE METHOD, USER DEVICE, AND THIRD-PARTY DEVICE

BACKGROUND OF THE INVENTION

1. Field of the Invention

The present invention relates to an electronic value exchange method for implementing fair exchange of electronic values (e.g., electronic money, electronic tickets, etc.) being information electronically representing values, and relates to a user device and a third-party device for such electronic value exchange.

2. Related Background Art

There is the conventionally known technology concerning the electronic value exchange for safely exchanging electronic values (e.g., electronic money, electronic tickets, etc.) being information electronically representing values, and Japanese Patent Application Laid-Open No. 2004-341643 suggests the technology of implementing a fair trade in the electronic value exchange through the use of a third-party device. The "fair trade" stated herein means mutual exchange of electronic values meeting the condition that neither of two parties involved in the trade loses an electronic value of a trading object of its own, without gaining an electronic value as a consideration or without obtaining a guarantee for acquisition thereof.

SUMMARY OF THE INVENTION

In the technology of implementing the fair trade in the electronic value exchange through the use of the third-party device as described above, however, various pieces of control information are exchanged multiple times between the parties involved in the trade, and on such occasions information containing essentially unnecessary control information is sometimes transmitted and received, so as to lead possibly to an increase in volume of data transmitted and received. In addition, the third-party device has to manage states while appropriately discriminating a plurality of concurrent electronic value exchanges, but there is no proposal on technology of appropriately managing states of multiple electronic value exchanges. As described above, the technology for implementing the fair trade in the electronic value exchange is not mature yet, and there are desires for further promotion of efficiency of processing and improvement in processing.

The present invention has been accomplished in order to solve the above problem and an object of the present invention is to provide an electronic value exchange method, a user device, and a third-party device capable of achieving further promotion of efficiency of processing and improvement in processing for assuring fairness in electronic value exchange.

An electronic value exchange method according to the present invention is a method of exchanging a first electronic value stored in a first user device, for a second electronic value stored in a second user device, the method being an electronic value exchange method of: letting the first user device execute an offer step including: a step of generating a first random number; and a step of outputting offer information being information corresponding to at least the first random number; letting the second user device execute an agreement step including: a step of acquiring the offer information; a step of generating a second random number; a step of generating session information corresponding to the second random number; a step of generating agreement object information corresponding to information containing at least the session information; a step of generating an electronic signature Sa corresponding to information containing the agreement object information and the session information; and a step of outputting agreement information being information containing at least the agreement object information, the session information, and the electronic signature Sa; letting the first user device execute a first confirmation step including: a step of acquiring the agreement information; a step of performing a verification on a predetermined verification item; a step of generating an electronic signature Se for information containing the session information; and a step of outputting first confirmation information being information containing at least the session information and the electronic signature Se; letting the second user device execute a second confirmation step including: a step of acquiring the first confirmation information; a step of performing a verification on a predetermined verification item; and a step of outputting second confirmation information being information containing the second random number; and letting the first user device execute an end step including: a step of acquiring the second confirmation information; and a step of performing a verification on a predetermined verification item; wherein the second user device executes an abort request step including: a step of generating an electronic signature for information containing information indicating an abort request, and the session information; and a step of outputting abort request information being information containing the information indicating the abort request, the session information, and the electronic signature; and wherein a third-party device executes an abort determination step including: a step of acquiring the abort request information; a step of performing a verification on a predetermined verification item; and a step of determining whether a session state corresponding to the session information is defined as commit, and, if the session state is not defined as commit, making the session state corresponding to the session information so as to define the session state as abort.

In the above electronic value exchange method, the second user device generates the electronic signature for the information containing the session information and the information indicating the abort request, using only the session information contained in the agreement information, instead of the agreement information, and outputs the abort request information being the information containing the session information, the information indicating the abort request, and the electronic signature; therefore, transmission/reception can be performed without essentially unnecessary control information, so as to avoid an increase in volume of data transmitted and received. In addition, the third-party device makes the session state corresponding to the session information so as to define the session state as abort, and is thus able to manage states while appropriately discriminating a plurality of concurrent electronic value exchanges. In this manner, the method achieves further promotion of efficiency of processing and improvement in processing for assuring fairness in the electronic value exchange.

The above electronic value exchange method is preferably configured as follows: when the session state is defined as abort, the third-party device executes an abort permission step including: a step of generating an electronic signature for information containing information indicating an abort permission, and the session information; and a step of outputting abort permission information being information containing the information indicating the abort permission, the session information, and the electronic signature; and the first user device further executes an abort performance step including: a step of acquiring the abort permission information; and a step of performing a verification on a predetermined verification item. In this manner, the third-party device generates the electronic signature for the information containing the session information and the information indicating the abort permission, using only the session information contained in the agreement information, instead of the agreement information, and outputs the abort permission information being the information containing the session information, the information indicating the abort permission, and the electronic signature, to the first user device; therefore, the transmission/reception can be performed between the third-party device and the first user device, without essentially unnecessary control information, so as to avoid an increase in volume of transmitted and received data.

The above electronic value exchange method is preferably configured as follows: when the session state is defined as abort, the third-party device executes an abort permission step including: a step of generating an electronic signature for information containing information indicating an abort permission, and the session information; and a step of outputting abort permission information being information containing the information indicating the abort permission, the session information, and the electronic signature; and the second user device further executes an abort performance step including: a step of acquiring the abort permission information; and a step of performing a verification on a predetermined verification item. In this manner, the third-party device generates the electronic signature for the information containing the session information and the information indicating the abort permission, using only the session information contained in the agreement information, instead of the agreement information, and outputs the abort permission information being the information containing the session information, the information indicating the abort permission, and the electronic signature, to the second user device; therefore, the transmission/reception can be performed between the third-party device and the second user device, without essentially unnecessary control information, so as to avoid an increase in volume of transmitted and received data.

Another electronic value exchange method according to the present invention is a method of exchanging a first electronic value stored in a first user device, for a second electronic value stored in a second user device, the method being an electronic value exchange method of: letting the first user device execute an offer step including: a step of generating a first random number; and a step of outputting offer information being information corresponding to at least the first random number; letting the second user device execute an agreement step including: a step of acquiring the offer information; a step of generating a second random number; a step of generating session information corresponding to the second random number; a step of generating agreement object information corresponding to information containing at least the session information; a step of generating an electronic signature Sa corresponding to information containing the agreement object information and the session information; and a step of outputting agreement information being information containing at least the agreement object information, the session information, and the electronic signature Sa; letting the first user device execute a first confirmation step including: a step of acquiring the agreement information; a step of performing a verification on a predetermined verification item; a step of generating an electronic signature Se for information containing the session information; and a step of outputting first confirmation information being information containing at least the session information and the electronic signature Se; letting the second user device execute a second confirmation step including: a step of acquiring the first confirmation information; a step of performing a verification on a predetermined verification item; and a step of outputting second confirmation information being information containing the second random number; and letting the first user device execute an end step including: a step of acquiring the second confirmation information; and a step of performing a verification on a predetermined verification item; wherein the first user device executes a commitment request step including: a step of generating an electronic signature for information containing information indicating a commitment request, and the session information; and a step of outputting commitment request information being information containing the information indicating the commitment request, the session information, and the electronic signature; and wherein a third-party device executes a commitment determination step including: a step of acquiring the commitment request information; a step of performing a verification on a predetermined verification item; and a step of determining whether a session state corresponding to the session information is defined as abort, and, if the session state is not defined as abort, making the session state corresponding to the session information to define the session state as commit.

In the above electronic value exchange method, the first user device generates the electronic signature for the information containing the session information and the information indicating the commitment request, using only the session information contained in the agreement information, instead of the agreement information, and outputs the commitment request information being the information containing the session information, the information indicating the commitment request, and the electronic signature; therefore, the transmission/reception can be performed without essentially unnecessary control information, so as to avoid an increase in volume of transmitted and received data. In addition, the third-party device makes the session state corresponding to the session information so as to define the session state as commit, and is thus able to manage states while appropriately discriminating a plurality of concurrent electronic value exchanges. In this manner, the method achieves further promotion of efficiency of processing and improvement in processing for assuring fairness in the electronic value exchange.

The above electronic value exchange method is preferably configured as follows: when the session state is defined as commit, the third-party device executes a commitment permission step including: a step of generating an electronic signature for information containing information indicating a commitment permission, and the session information; and a step of outputting commitment permission information being information containing the information indicating the commitment permission, the session information, and the electronic signature; and the first user device further executes a commitment performance step including: a step of acquiring the commitment permission information; and a step of performing a verification on a predetermined verification item. In this manner, the third-party device generates the electronic signature for the information containing the session information and the information indicating the commitment permission, using only the session information contained in the agreement information, instead of the agreement information, and outputs the commitment permission information being the information containing the session information, the information indicating the commitment permission, and the electronic signature, to the first user device; therefore, the transmission/reception can be performed between the third-party device and the first user device, without essentially unnecessary control information, so as to avoid an increase in volume of transmitted and received data.

The above electronic value exchange method is preferably configured as follows: when the session state is defined as commit, the third-party device executes a commitment permission step including: a step of generating an electronic signature for information containing information indicating a commitment permission, and the session information; and a step of outputting commitment permission information being information containing the information indicating the commitment permission, the session information, and the electronic signature; and the second user device further executes a commitment performance step including: a step of acquiring the commitment permission information; and a step of performing a verification on a predetermined verification item. In this manner, the third-party device generates the electronic signature for the information containing the session information and the information indicating the commitment permission, using only the session information contained in the agreement information, instead of the agreement information, and outputs the commitment permission information being the information containing the session information, the information indicating the commitment permission, and the electronic signature, to the second user device; therefore, the transmission/reception can be performed between the third-party device and the second user device, without essentially unnecessary control information, so as to avoid an increase in volume of transmitted and received data.

Incidentally, the present invention permits various processing steps to be applied as processing steps before arrival at the processing steps associated with the abort request and the commitment request.

For example, the aforementioned electronic value exchange method associated with the abort request can be described as stated below. "Second session information" in the description below corresponds to the "session information" in the aforementioned aspect of the present invention, and "start information" to the "offer information" in the aforementioned aspect of the invention.

Another electronic value exchange method according to the present invention is a method of exchanging a first electronic value stored in a first user device, for a second electronic value stored in a second user device, the method being an electronic value exchange method of: letting the first user device execute a start step including: a step of generating a first random number; a step of generating first session information corresponding to the first random number; and a step of outputting start information being information containing the first session information, and a first electronic value; letting the second user device execute an agreement step including: a step of acquiring the start information and the first electronic value; a step of generating a second random number; a step of generating second session information corresponding to the second random number; a step of generating agreement object information corresponding to the first electronic value, a second electronic value, and the first session information; a step of generating an electronic signature Sa for information containing the agreement object information and the second session information; and a step of deleting the second electronic value, and outputting agreement information being information containing the agreement object information, the second session information, and the electronic signature Sa, and the second electronic value; letting the first user device further execute a first confirmation step including: a step of acquiring the agreement information and the second electronic value; a first verification step of performing a verification on a predetermined verification item; a step of generating an electronic signature Se for information containing the second session information; a step of deleting the first electronic value; and a step of outputting first confirmation information being information containing the second session information and the electronic signature Se; letting the second user device further execute a second confirmation step including: a step of acquiring the first confirmation information; a second verification step of performing a verification on a predetermined verification item; a step of storing the first electronic value; and a step of outputting second confirmation information being information containing the second random number; and letting the first user device further execute an end step including: a step of acquiring the second confirmation information; a third verification step of performing a verification on a predetermined verification item; and a step of storing the second electronic value; wherein the second user device executes an abort request step including: a step of generating an electronic signature Sab for information containing information indicating an abort request, and the second session information; and a step of outputting abort request information being information containing the information indicating the abort request, the second session information, and the electronic signature Sab; and wherein a third-party device executes an abort determination step including: a step of acquiring the abort request information; a fourth verification step of performing a verification on a predetermined verification item; and a step of determining whether a session state corresponding to the second session information is defined as commit, and, if the session state is not defined as commit, making the session state corresponding to the second session information so as to define the session state as abort.

Similarly, the aforementioned electronic value exchange method associated with the commitment request can also be described as follows. Another electronic value exchange method according to the present invention is a method of exchanging a first electronic value stored in a first user device, for a second electronic value stored in a second user device, the method being an electronic value exchange method of: letting the first user device execute a start step including: a step of generating a first random number; a step of generating first session information corresponding to the first random number; and a step of outputting start information being information containing the first session information, and a first electronic value; letting the second user device execute an agreement step including: a step of acquiring the start information and the first electronic value; a step of generating a second random number; a step of generating second session information corresponding to the second random number; a step of generating agreement object information corresponding to the first electronic value, a second electronic value, and the first session information; a step of generating an electronic signature Sa for information containing the agreement object information and the second session information; and a step of deleting the second electronic value, and outputting agreement information being information containing the agreement object information, the second session information, and the electronic signature Sa, and the second electronic value; letting the first user device further execute a first confirmation step including: a step of acquiring the agreement information and the second electronic value; a first verification step of performing a verification on a predetermined verification item; a step of generating an electronic signature Se for information containing the second session information; a step of deleting the first electronic value; and a step of outputting first confirmation information being information containing the second session information and the electronic signature Se; letting the second user device further execute a second confirmation step including: a step of acquiring the first confirmation information; a second verification step of performing a verification on a predetermined verification item; a step of storing the first electronic value; and a step of outputting second confirmation information being information containing the second random number; and letting the first user device further execute an end step including: a step of acquiring the second confirmation information; a third verification step of performing a verification on a predetermined verification item; and a step of storing the second electronic value; wherein the first user device executes a commitment request step including: a step of generating an electronic signature Sco for information containing information indicating a commitment request, and the second session information; and a step of outputting commitment request information being information containing the information indicating the commitment request, the second session information, and the electronic signature Sco; and wherein a third-party device executes a commitment determination step including: a step of acquiring the commitment request information; a fifth verification step of performing a verification on a predetermined verification item; and a step of determining whether a session state corresponding to the second session information is defined as abort, and, if the session state is not defined as abort, making the session state corresponding to the second session information so as to define the session state as commit.

Incidentally, the present invention can also be described as follows, as an aspect of the invention associated with the second user device. A user device according to the present invention is a user device for performing an exchange with another user device to exchange a first electronic value stored in said another user device, for a second electronic value stored in the user device itself, the user device comprising: agreement means for acquiring offer information being information corresponding to at least a first random number, from said another user device, generating a second random number, generating session information corresponding to the second random number, generating agreement object information corresponding to information containing at least the session information, generating an electronic signature Sa for information containing the agreement object information and the session information, and outputting agreement information being information containing at least the agreement object information, the session information, and the electronic signature Sa; and second confirmation means for acquiring from said another user device, first confirmation information being information containing an electronic signature Se for information containing the session information, and said session information, performing a verification on a predetermined verification item, and outputting second confirmation information being information containing the second random number; the user device comprising abort request means for generating an electronic signature for information containing information indicating an abort request, and the session information, and for outputting abort request information being information containing the information indicating the abort request, the session information, and the electronic signature.

The present invention can also be described as follows, as an aspect of the invention associated with the first user device. A user device according to the present invention is a user device for performing an exchange with another user device to exchange a second electronic value stored in said another user device, for a first electronic value stored in the user device itself, the user device comprising: offer means for generating a first random number, and outputting offer information being information corresponding to at least the first random number; first confirmation means for acquiring from said another user device, agreement information being information containing at least an electronic signature Sa for information containing agreement object information corresponding to information containing session information corresponding to a second random number, and the session information, the agreement object information, and the session information, performing a verification on a predetermined verification item, generating an electronic signature Se for information containing the session information, and outputting first confirmation information being information containing at least the session information and the electronic signature Se; and end means for acquiring second confirmation information being information containing the second random number, from said another user device, and for performing a verification on a predetermined verification item; the user device comprising commitment request means for generating an electronic signature for information containing information indicating a commitment request, and the session information, and for outputting commitment request information being information containing the information indicating the commitment request, the session information, and the electronic signature.

The present invention can also be described as follows, as an aspect of the invention associated with the third-party device for performing the abort determination. A third-party device according to the present invention is a third-party device used in a system for exchanging a first electronic value stored in a first user device, for a second electronic value stored in a second user device, said third-party device being used in the system configured as follows: the first user device executes an offer step of generating a first random number, and outputting offer information being information corresponding to at least the first random number; the second user device executes an agreement step of acquiring the offer information, generating a second random number, generating session information corresponding to the second random number, generating agreement object information corresponding to information containing at least the session information, generating an electronic signature Sa for information containing the agreement object information and the session information, and outputting agreement information being information containing at least the agreement object information, the session information, and the electronic signature Sa; the first user device executes a first confirmation step of acquiring the agreement information, performing a verification on a predetermined verification item, generating an electronic signature Se for information containing the session information, and outputting first confirmation information being information containing at least the session information and the electronic signature Se; the second user device executes a second confirmation step of acquiring the first confirmation information, performing a verification on a predetermined verification item, and outputting second confirmation information being information containing the second random number; and the first user device executes an end step of acquiring the second confirmation information, and performing a verification on a predetermined verification item; the third-party device comprising abort determination means configured so that when the second user device executes an abort request step of generating an electronic signature for information containing information indicating an abort request, and the session information, and outputting abort request information being information containing the information indicating the abort request, the session information, and the electronic signature, the abort determination means acquires the abort request information, performs a verification on a predetermined verification item, and determines whether a session state corresponding to the session information is defined as commit, and, if the session state is not defined as commit, the abort determination means makes the session state corresponding to the session information so as to define the session state as abort.

The third-party device according to the present invention is preferably configured as follows: it further comprises abort permission means configured so that when the session state is defined as abort, the abort permission means generates an electronic signature for information containing information indicating an abort permission, and the session information, and outputs abort permission information being information containing the information indicating the abort permission, the session information, and the electronic signature.

The present invention can also be described as follows, as an aspect of the invention associated with the third-party device for performing the commitment determination. A third-party device according to the present invention is a third-party device used in a system for exchanging a first electronic value stored in a first user device, for a second electronic value stored in a second user device, said third-party device being used in the system configured as follows: the first user device executes an offer step of generating a first random number, and outputting offer information being information corresponding to at least the first random number; the second user device executes an agreement step of acquiring the offer information, generating a second random number, generating session information corresponding to the second random number, generating agreement object information corresponding to information containing at least the session information, generating an electronic signature Sa for information containing the agreement object information and the session information, and outputting agreement information being information containing at least the agreement object information, the session information, and the electronic signature Sa; the first user device executes a first confirmation step of acquiring the agreement information, performing a verification on a predetermined verification item, generating an electronic signature Se for information containing the session information, and outputting first confirmation information being information containing at least the session information and the electronic signature Se; the second user device executes a second confirmation step of acquiring the first confirmation information, performing a verification on a predetermined verification item, and outputting second confirmation information being information containing the second random number; and the first user device executes an end step of acquiring the second confirmation information, and performing a verification on a predetermined verification item; the third-party device comprising commitment determination means configured so that when the first user device executes a commitment request step of generating an electronic signature for information containing information indicating a commitment request, and the session information, and outputting commitment request information being information containing the information indicating the commitment request, the session information, and the electronic signature, the commitment determination means acquires the commitment request information, performs a verification on a predetermined verification item, and determines whether a session state corresponding to the session information is defined as abort, and, if the session state is not defined as abort, the commitment determination means makes the session state corresponding to the session information so as to define the session state as commit.

The third-party device according to the present invention is preferably configured as follows: it further comprises commitment permission means configured so that when the session state is defined as commit, the commitment permission means generates an electronic signature for information containing information indicating a commitment permission, and the session information, and outputs commitment permission information being information containing the information indicating the commitment permission, the session information, and the electronic signature.

The present invention successfully achieves further promotion of efficiency of processing and improvement in processing for assuring fairness in the electronic value exchange.

BRIEF DESCRIPTION OF THE DRAWINGS

FIG. 11 is an illustration showing an example of a management table of third session states.

DESCRIPTION OF THE PREFERRED EMBODIMENTS

Embodiments of the present invention will be described below with reference to the drawings.

Figure 1:
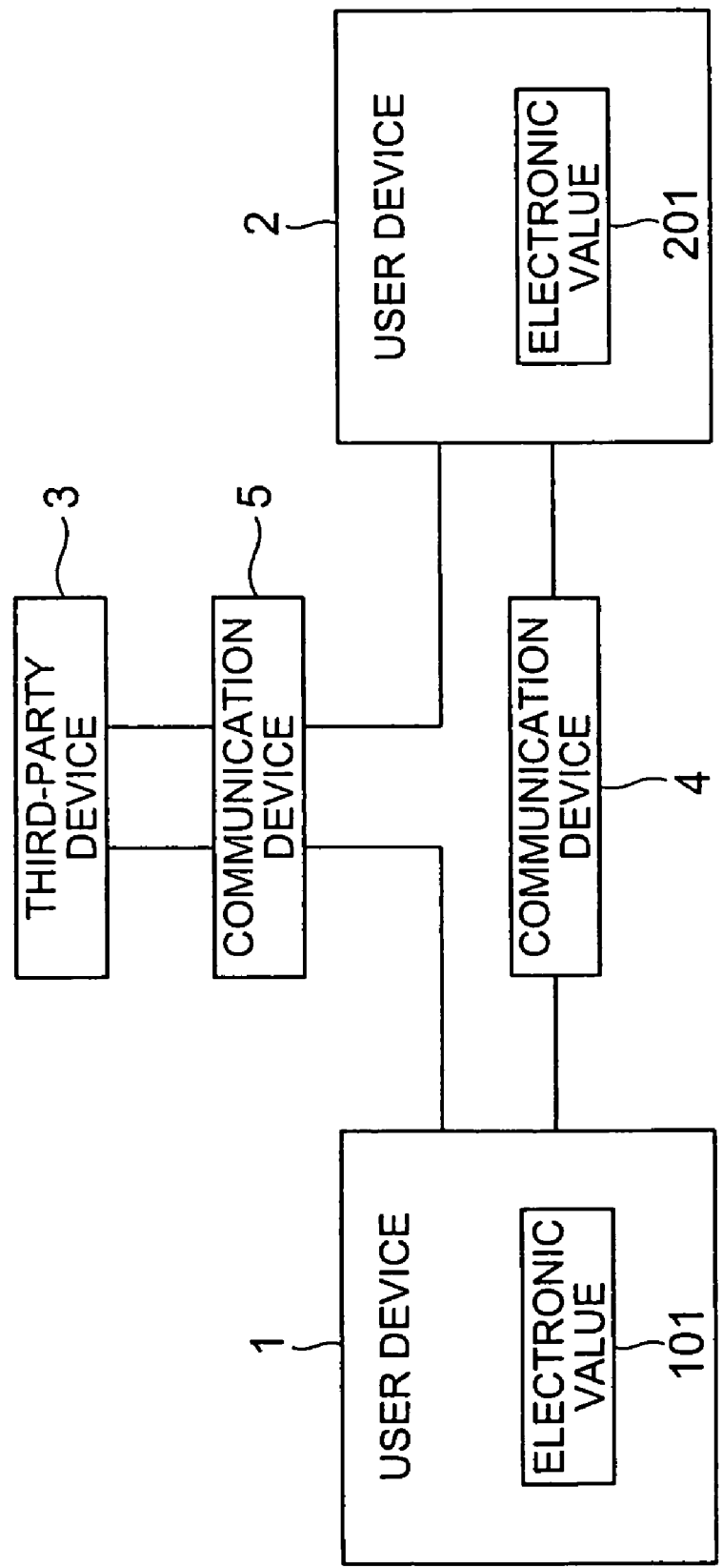
FIG. 1 is an illustration showing a configuration of an electronic value exchange system in an embodiment of the present invention.

FIG. 1 is an illustration showing an overall configuration of an electronic value exchange system according to the present invention.

FIG. 1 shows a case where user device 1 is connected through communication means 4 to user device 2 and where an exchange transaction is performed so as to erase electronic value 101 stored in user device 1 and store it into user device 2 and further to erase electronic value 201 stored in user device 2 and store it into user device 1, through communication means 4. Each of the user devices 1, 2 is comprised of a portable terminal equipped with a tamper-resistant device (an IC card or the like) at a predetermined location (i.e., an aggregate of a tamper-resistant device and a portable terminal).

Furthermore, the system shown in FIG. 1 includes third-party device 3 connected through communication means 5 to the user devices 1 and 2. If the user device 1 and user device 2 find an abnormality in performance of the exchange transaction, e.g., detection of a blackout of communication means 4, the user device 1 or 2 finding the abnormality transmits information according to a point of occurrence of the abnormality, to the third-party device 3.

The third-party device 3 determines whether the exchange transaction is to be aborted or committed, according to the transmitted information, and returns information according to the determination result to the source user device. The user device, receiving the information returned from the third-party device, performs either an operation of aborting the exchange transaction according to the determination result and returning the electronic value to the original location, or an operation of deeming the exchange transaction as having been committed and storing the electronic value as an exchange object.

The communication means 4 herein is a temporary communication means, and does not have to establish a constant connection between the user devices 1 and 2. The communication means 5 is also a temporary communication means and does not have to establish a constant connection between the user devices and the third-party device. The communication means 4 and 5 may be provided by a single communication network.

Next, configurations and operations of the respective devices will be described in detail.

Figure 2:
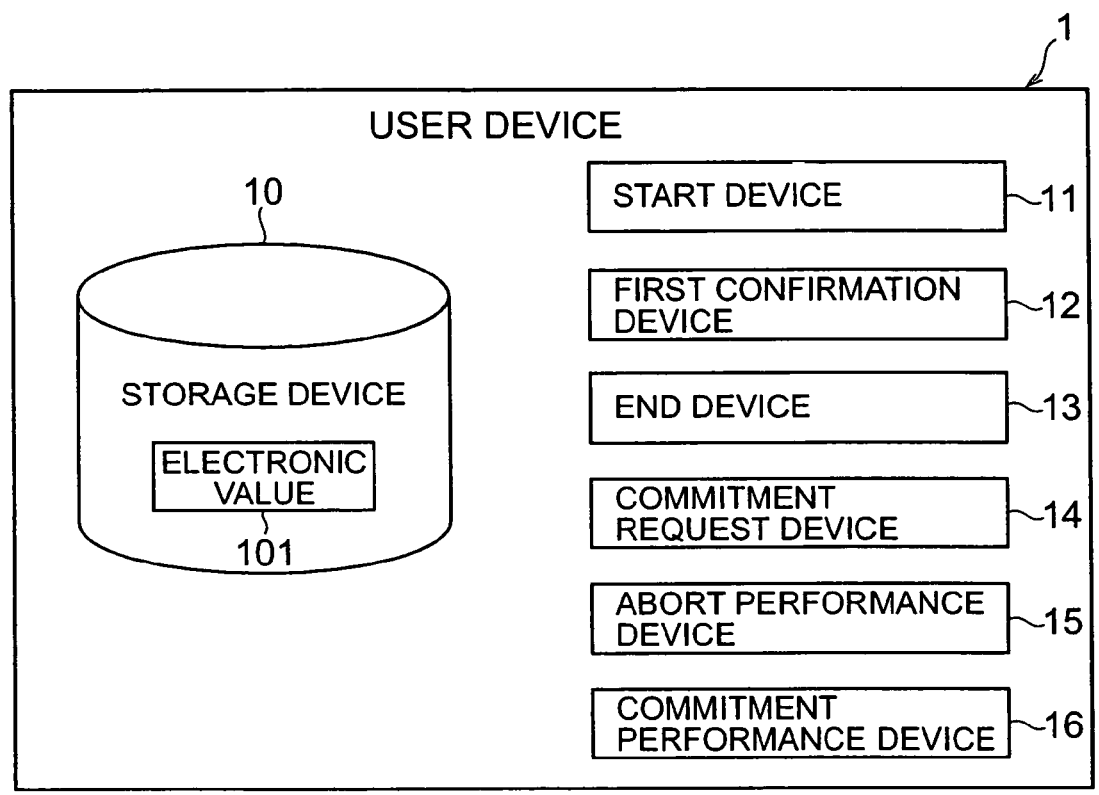
FIG. 2 is an illustration showing a configuration of user device 1.

FIG. 2 is an illustration showing a configuration of user device 1 in an embodiment of the present invention. The user device 1 shown in the same figure has storage device 10, start device 11, first confirmation device 12, end device 13, commitment request device 14, abort performance device 15, and commitment performance device 16. As described previously, the user device 1 is comprised, for example, of a portable terminal equipped with a tamper-resistant device (an IC card or the like) at a predetermined location, and the storage device 10 is comprised of a memory of the tamper-resistant device. For this reason, data stored in the storage device 10 is prevented from being tampered.

Figure 3:
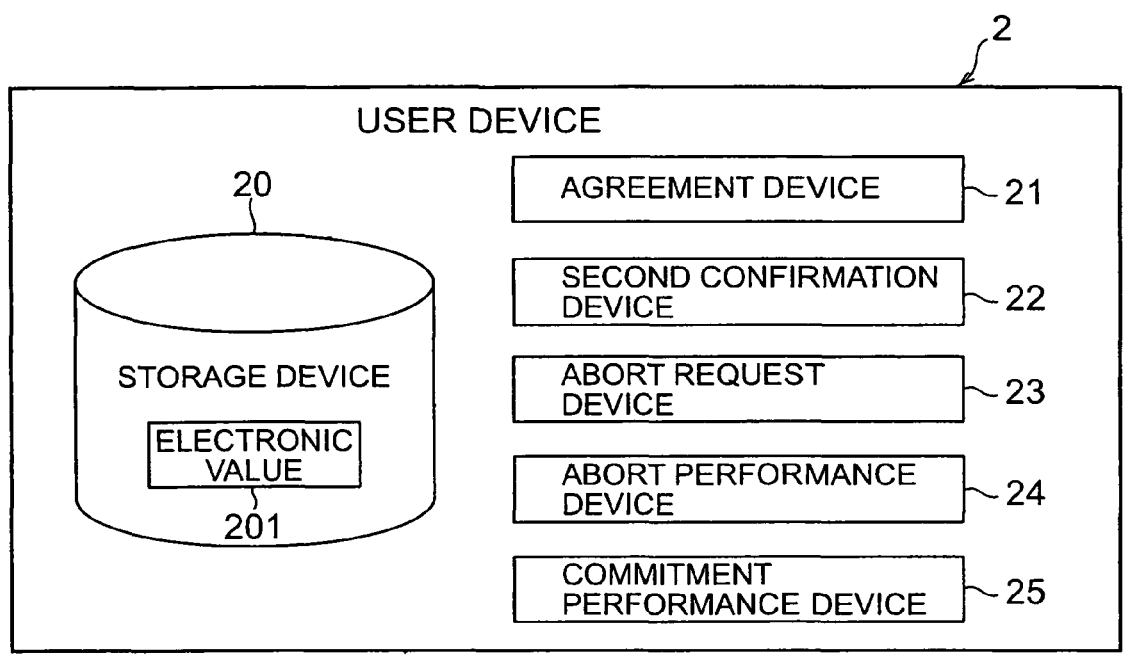
FIG. 3 is an illustration showing a configuration of user device 2.

FIG. 3 is an illustration showing a configuration of user device 2 in an embodiment of the present invention. The user device 2 shown in the same figure has storage device 20, agreement device 21, second confirmation device 22, abort request device 23, abort performance device 24, and commitment performance device 25. As described previously, the user device 2 is comprised, for example, of a portable terminal equipped with a tamper-resistant device (an IC card or the like) at a predetermined location, and the storage device 20 is comprised of a memory of the tamper-resistant device. For this reason, data stored in the storage device 20 is prevented from being tampered.

Figure 4:
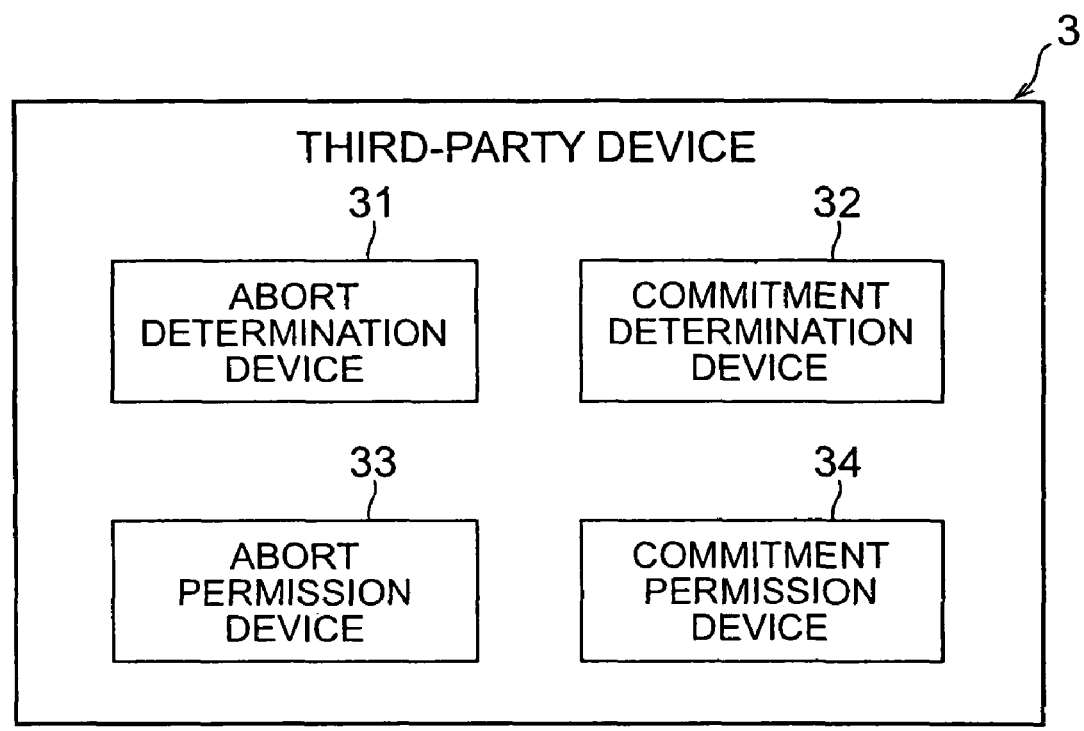
FIG. 4 is an illustration showing a configuration of third-party device 3.

FIG. 4 is an illustration showing a configuration of third-party device 3 in an embodiment of the present invention. The third-party device 3 shown in the same figure has abort determination device 31, commitment determination device 32, abort permission device 33, and commitment permission device 34. Typically, the third-party device 3 herein is comprised of a server connected to a public network such as the Internet, and awaits a connection from a user device.

The communication means 4 in FIG. 1 can be two IC card reader/writers mutually connected through a communication medium such as an infrared communication line or the Internet. The communication means 5 can be an IC card reader/writer or the like connected through a communication medium such as the Internet to the third-party device 3.

The following will describe a method of fairly exchanging electronic value 101 stored in storage device 10, for electronic value 201 stored in storage device 20, using the devices of the configurations as described above.

It is assumed in the following description that the user device 1 preliminarily retains a public key certificate CertP1 containing a public key P1, the user device 2 a public key certificate CertP2 containing a public key P2, and the third-party device 3 a public key certificate CertP3 containing a public key P3. Here the public key certificates CertP1, CertP2 are issued by a user device certificate authority being a first certificate authority, and the public key certificate CertP3 is a public key certificate issued by a third-party device certificate authority being a second certificate authority.

Figure 5:
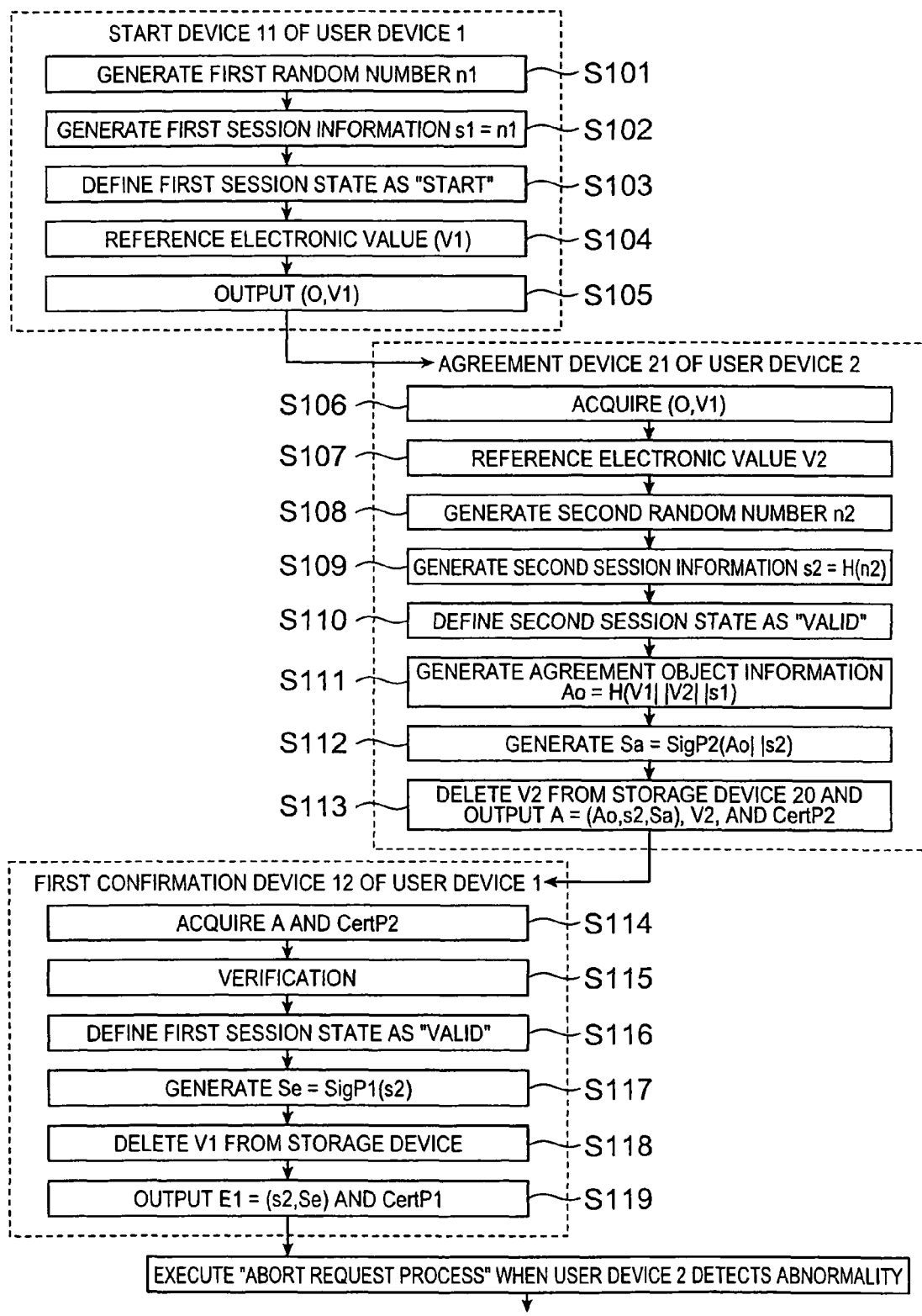
FIG. 5 is an illustration showing a procedure in the first stage of main processing.
Figure 6:
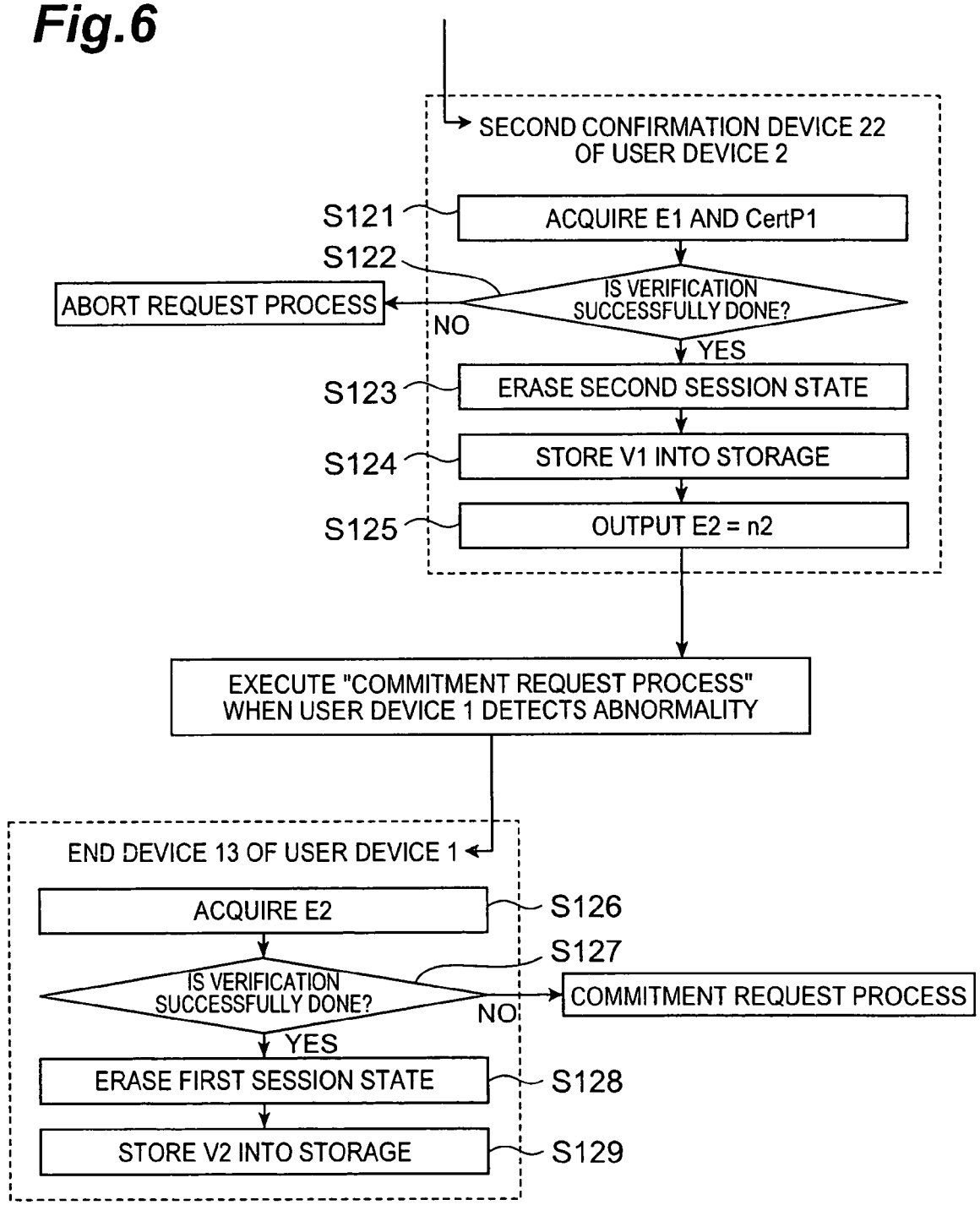
FIG. 6 is an illustration showing a procedure in the second stage of main processing.

An exchange of electronic values by this method is started by executing the main processing shown in FIGS. 5 and 6, as an example. If an abnormality is found in performance of the main processing, execution of the main processing is suspended to branch into an abort request process or into a commitment request process. After execution of the abort request process and the commitment request process, the execution branches into an abort performance process or into a commitment performance process according to a state of the third-party device. These branching conditions will be described in the following description of processing. It is, however, noted that the main processing shown in FIGS. 5 and 6 is just an example and that the processing associated with recovery of fairness according to the present invention is also applicable to other modes of main processing.

[Main Processing]

The procedure of main processing will be described with reference to FIGS. 5 and 6.

First, the start device 11 of user device 1 executes a process below.

(step 101) It generates a first random number n1. It is noted that "S", e.g., in "S101" described in FIGS. 5 to 10 means "step".

(step 102) It generates first session information s1 corresponding to the first random number n1. At this step, for example, the first session information s1 equal to the first random number n1 is generated.

(step 103) It defines a first session state as "start". For example, information indicating "start" is stored in correspondence to the "first session state".

(step 104) It references electronic value 101 from the storage device 10. In the description hereinafter, the electronic value 101 is assumed to be an electronic value V1.

(step 105) It outputs the start information O and the electronic value V1 equivalent to the first session information s1, i.e., (O,V1) to the communication means 4. The start information O corresponds to the "offer information" in the present invention.

The communication means 4 transfers (O,V1) from the user device 1 to the user device 2.

Subsequently, the agreement device 21 of the user device 2 executes a process below.

(step 106) It acquires the start information O and electronic value V1 from the communication means 4.

(step 107) It references the electronic value 201 from the storage device 20. In the description below, the electronic value 201 is assumed to be an electronic value V2.

(step 108) It generates a second random number n2.

(step 109) Using a one-way function H( ), it generates second session information s2=H(n2) corresponding to the second random number n2. The second session information s2 corresponds to the "session information" in the present invention.

(step 110) It defines a second session state as "valid". For example, information indicating "valid" is stored in correspondence to the "second session state".

(step 111) Using the one-way function Ho, it generates agreement object information Ao=H(V1∥V2∥s1) corresponding to the electronic values V1, V2 and the first session information s1. The notation "∥" herein represents a concatenation.

(step 112) It generates an electronic signature Sa=SigP2(Ao||s2) for the information containing the agreement object information Ao and the second session information s2. Here SigP2( ) is a signature function to generate an electronic signature that can be verified by public key P2. Examples of this signature function to be applied include ESIGN, ECDSA, and so on.

(step 113) It deletes the electronic value V2 from the storage device 20, and outputs the agreement information A=(Ao, s2,Sa), the electronic value V2, and the public key certificate CertP2 to the communication means 4. Here the agreement information A is information containing the agreement object information Ao, the second session information s2, and the electronic signature Sa.

Then the communication means 4 transfers the agreement information A, the electronic value V2, and the public key certificate CertP2, i.e., (A,V2,CertP2) from the user device 2 to the user device 1.

Subsequently, the first confirmation device 12 of the user device 1 executes a process below.

(step 114) It acquires the agreement information A and the public key certificate CertP2 from the communication means 4.

(step 115) It performs a verification on the items below and, if it results in a failure even about only one item, the subsequent processing is interrupted.

The first session state is "start".

The public key certificate CertP2 is a valid public key certificate issued by the user certificate authority.

The electronic signature Sa=SigP2(Ao||s2) is successfully verified by the public key P2.

The agreement object information Ao=H(V1||V2||s) is approved.

(step 116) It defines the first session state as "valid".

(step 117) It generates an electronic signature Se=SigP1(s2) for the information containing the second session information s2. Here SigP1( ) is a signature function to generate an electronic signature that can be verified by the public key P1.

(step 118) It deletes the electronic value V1 from the storage device 10.

(step 119) It outputs first confirmation information E1=(s2, Se) being information containing the second session information s2 and the electronic signature Se, and the public key certificate CertP1 to the communication means 4.

Then the communication means 4 transfers the first confirmation information E1 and the public key certificate CertP1, i.e., (E1,CertP1) from the user device 1 to the user device 2. When this transfer is not carried out within a fixed time, to result in detection of an abnormality, e.g., a time-out, the user device 2 interrupts the subsequent processing and executes the "abort request process".

Subsequently, the second confirmation device 22 of the user device 2 executes a process below.

(step 121) It acquires the first confirmation information E1 and the public key certificate CertP1 from the communication means 4.

(step 122) It performs a verification on the following items and, if the verification results in a failure even about only one item, it interrupts the subsequent processing and executes the "abort request process".

The second session state is "valid".

The public key certificate CertP1 is a valid public key certificate issued by the user certificate authority.

The electronic signature Se=SigP1(s2) is successfully verified by the public key P1.

The second session information s2 contained in the first confirmation information E1 is the same as the second session information s2 contained in the agreement information A.

(step 123) It deletes the second session state.

(step 124) It stores the electronic value V1 into the storage device 20.

(step 125) It outputs second confirmation information being information containing the second random number, to the communication means 4. At this step, for example, it outputs the second confirmation information E2 equal to the second random number n2, to the communication means 4.

Then the communication means 4 transfers the second confirmation information E2 from the user device 2 to the user device 1. If this transfer is not carried out within a fixed time, to result in detection of an abnormality, e.g., a time-out, the user device 1 interrupts the subsequent processing and executes the "commitment request process".

Subsequently, the end device of the user device 1 executes a process below.

(step 126) It acquires the second confirmation information E2 from the communication means 4.

(step 127) It performs a verification on the following items and, if the verification results in a failure even about only one item, it interrupts the subsequent processing and executes the "commitment request process".

The first session state is "valid".

The second session information s2=H(n2) is approved.

(step 128) It erases the first session state.

(step 129) It stores the electronic value V2 into the storage device 10.

After the main processing consisting of the procedure from step 101 to step 129 described above has been executed to the end, the processing is terminated. At this point, the electronic value V2 (i.e., electronic value 201) is stored in the storage device 10 of the user device 1, and the electronic value V1 (i.e., electronic value 101) in the storage device 20 of the user device 2; therefore, the aforementioned electronic values are fairly exchanged.

(Abort Request Process)

Figure 7:
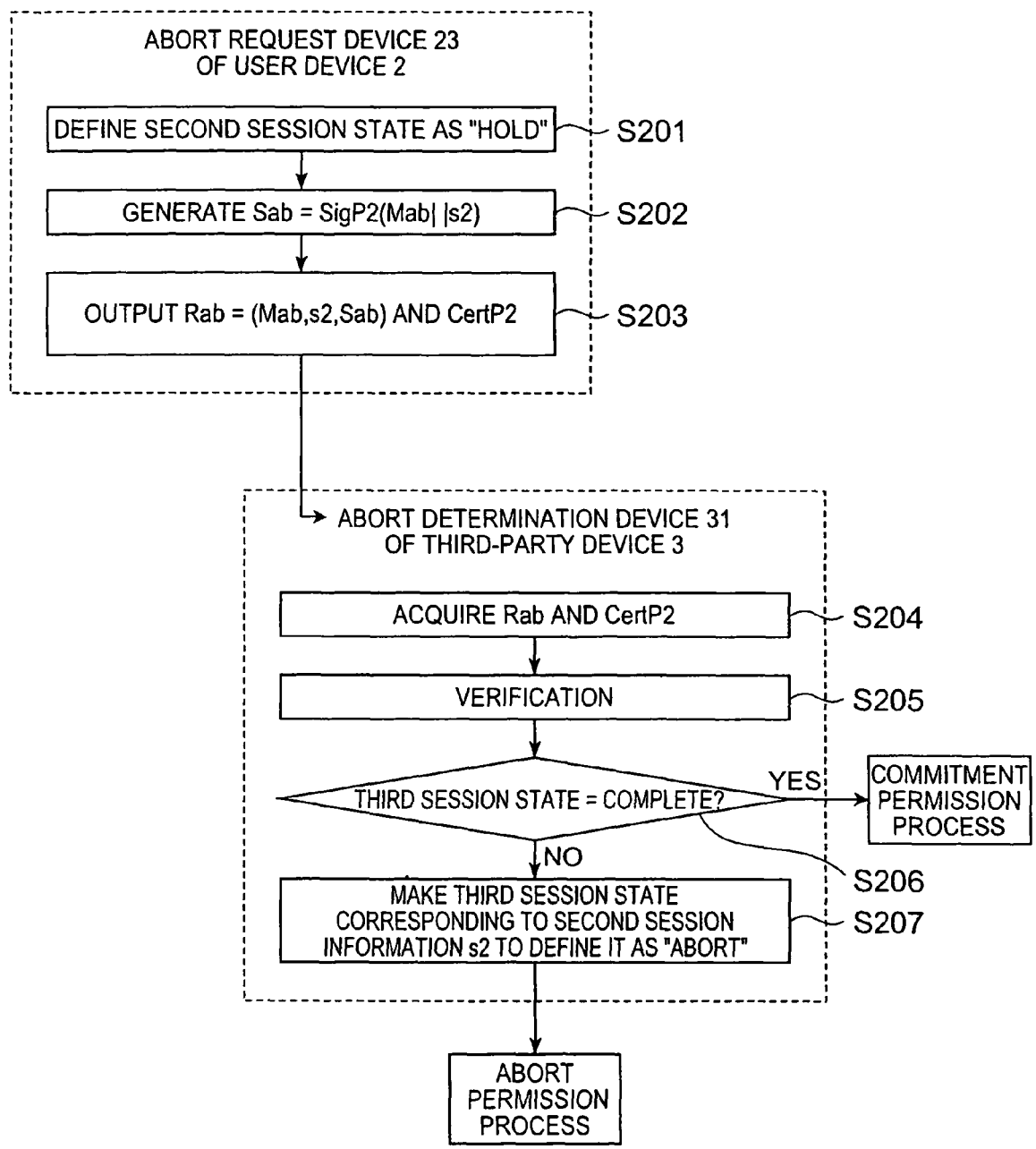
FIG. 7 is an illustration showing a procedure of an abort request process.

Next, the procedure of the "abort request process", which is executed by the user device 2 when one of the predetermined cases is met in the main processing, will be described with reference to FIG. 7.

First, the abort request device 23 of the user device 2 executes a process below.

(step 201) It defines the second session state as "hold".

(step 202) It generates an electronic signature Sab=SigP2(Mab||s2) for information containing information Mab indicating an abort request, and the second session information s2.

(step 203) It outputs to the communication means 5, abort request information Rab=(Mab,s2,Sab) being information containing the information Mab indicating the abort request, the second session information s2, and the electronic signature Sab, and the public key certificate CertP2.

The communication means 5 transfers the abort request information Rab and the public key certificate CertP2 from the user device 2 to the third-party device 3. Then the abort determination device 31 of the third-party device 3 executes a process below.

(step 204) It acquires the abort request information Rab and the public key certificate CertP2 from the communication means 5.

(step 205) It performs a verification on the following items and, if the verification results in a failure even about only one item, it interrupts the subsequent processing.

The public key certificate CertP2 is a valid public key certificate issued by the user certificate authority.

The electronic signature Sab=SigP2(Mab∥s2) is successfully verified by the public key P2.

(step 206) It references a third session state corresponding to the second session information s2 and branches the processing according to the content thereof. The "third session state" corresponds to the "session state" according to the present invention.

Figure 10:
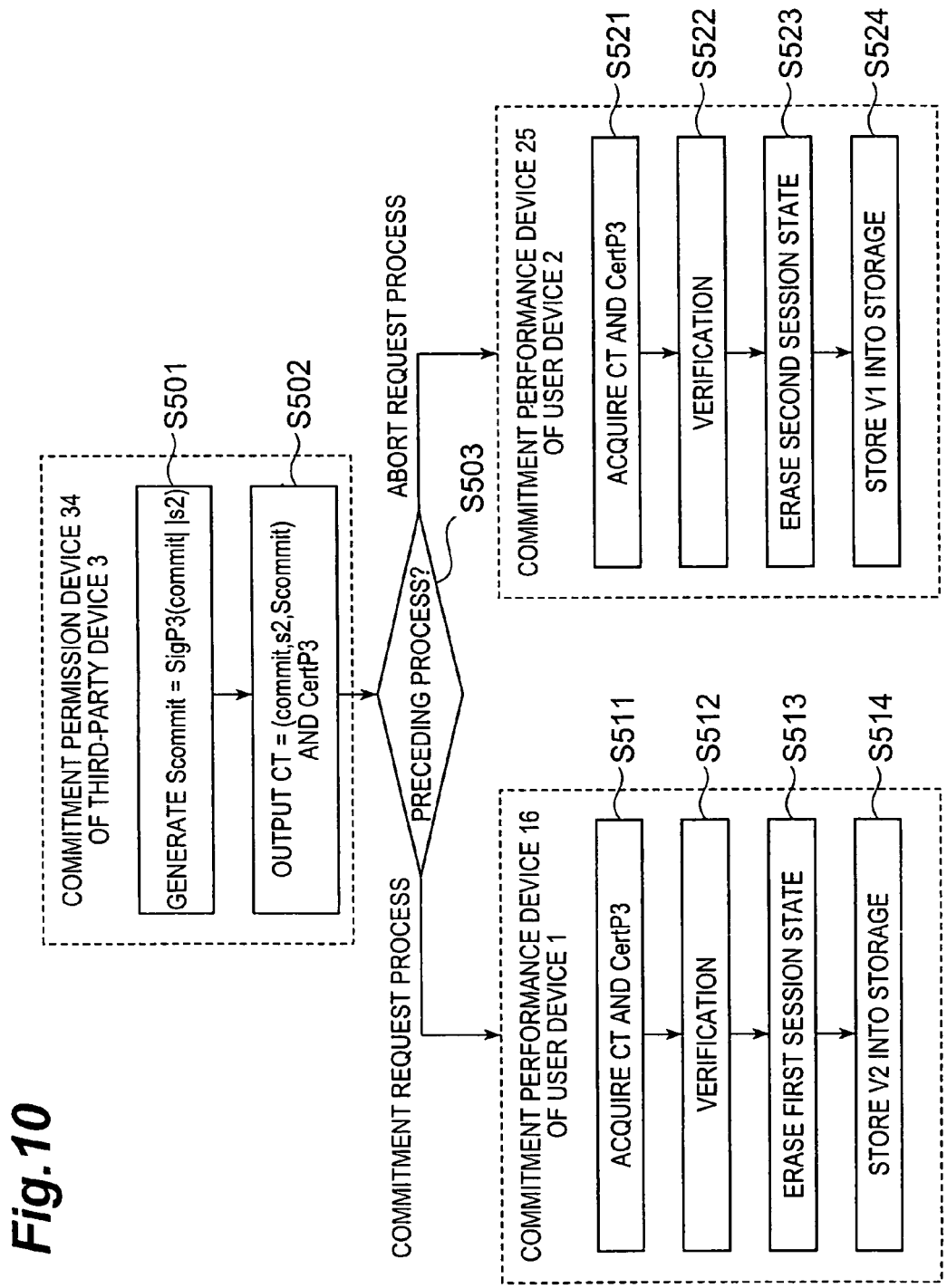
FIG. 10 is an illustration showing a procedure of a commitment permission process.

If the third session state is defined as "commit", the flow goes to the commitment permission process by the commitment permission device 34 in FIG. 10 which will be described later.

If the third session state is not defined as "commit", step 207 below is executed.

(step 207) It makes the third session state corresponding to the second session information s2 so as to define the third session state as "abort". For example, as shown in FIG. 11, the third session state is made corresponding to the second session information s2-1 to be defined as "abort". After that, the flow goes to the abort permission process by the abort permission device 33 in FIG. 9 which will be described later.

After commitment of the processing according to the above procedure, the abort request process is terminated.

At the above steps 202, 203, the abort request device 23 generates the electronic signature Sab for the information containing the second session information s2 and the information Mab indicating the abort request, using only the second session information s2 contained in the agreement information A, instead of the agreement information A, and outputs the abort request information Rab being information containing the second session information s2, the information Mab indicating the abort request, and the electronic signature Sab; therefore, the transmission/reception can be performed without essentially unnecessary control information, so as to avoid an increase in volume of transmitted and received data and achieve promotion of efficiency of the processing.

At step 207 the abort determination device 31 makes the third session state corresponding to the second session information s2 so as to define the third session state as "abort"; therefore, the third-party device is able to manage states while appropriately distinguishing a plurality of concurrent electronic value exchanges as shown in FIG. 11.

[Commitment Request Process]

Figure 8:
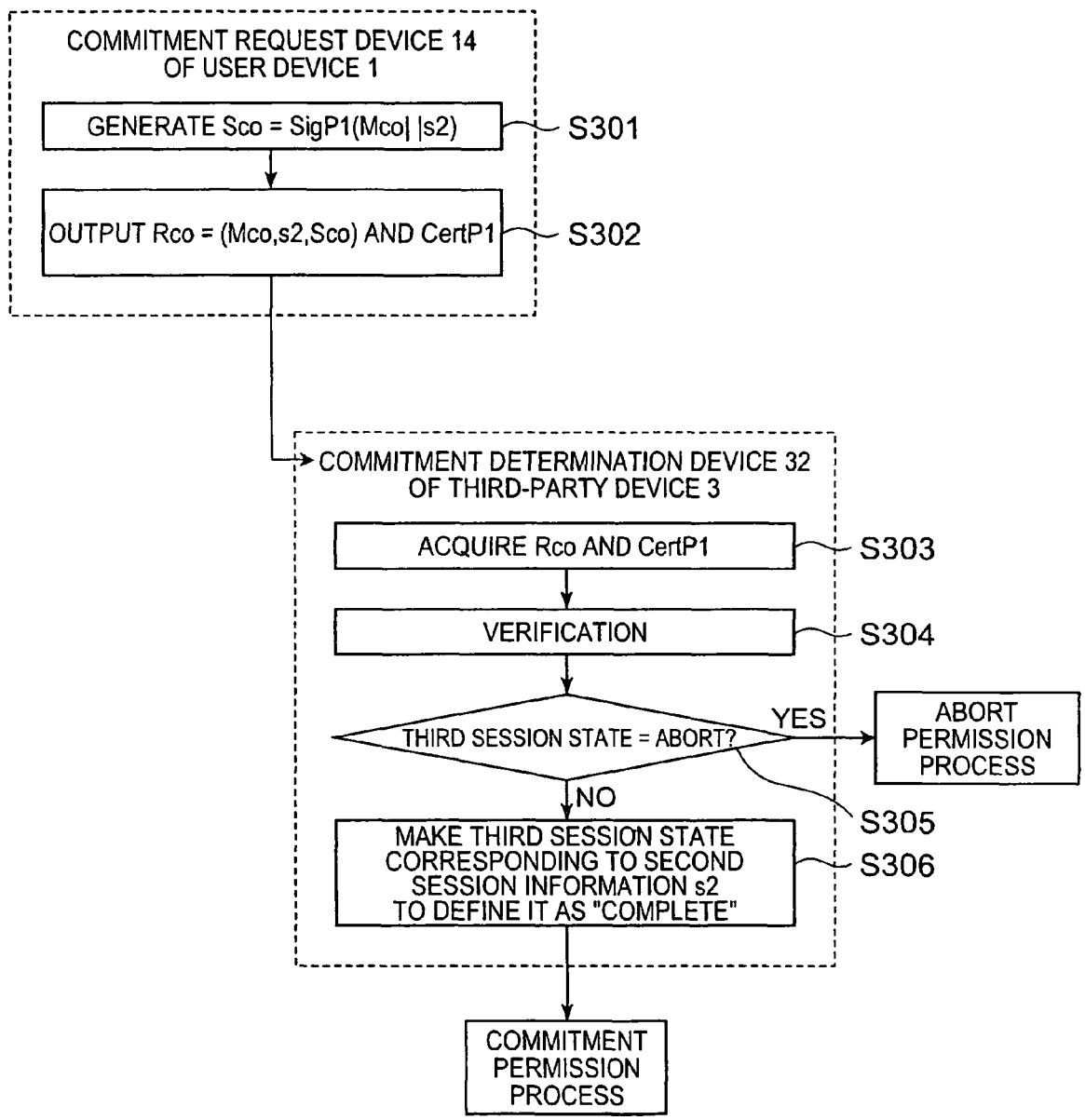
FIG. 8 is an illustration showing a procedure of a commitment request process.

Next, the procedure of the "commitment request process", which is executed by the user device 1 when one of the predetermined cases is met in the main processing, will be described with reference to FIG. 8. The commitment request process is executed according to the procedure below.

The commitment request device 14 of the user device 1 executes a process below.

(step 301) It generates an electronic signature Sco=SigP (Mco∥s2) for information containing information Mco indicating a commitment request, and the second session information s2.

(step 302) It outputs commitment request information Rco=(Mco,s2,Sco) being information containing the information Mco indicating the commitment request, the second session information s2, and the electronic signature Sco, and the public key certificate CertP1 to the communication means 5.

The communication means 5 transfers the commitment request information Rco and the public key certificate CertP2 from the user device 1 to the third-party device 3. Then the commitment determination device 32 of the third-party device 3 executes a process below.

(step 303) It acquires the commitment request information Rco and the public key certificate CertP1 from the communication means 5.

(step 304) It performs a verification on the following items and, if the verification results in a failure even about only one item, it interrupts the subsequent processing.

The public key certificate CertP1 is a valid public key certificate issued by the user certificate authority.

The electronic signature Sco=SigP1(Mco∥s2) is successfully verified by the public key P1.

(step 305) It references the third session state corresponding to the second session information s2 and branches the processing according to the content thereof.

Figure 9:
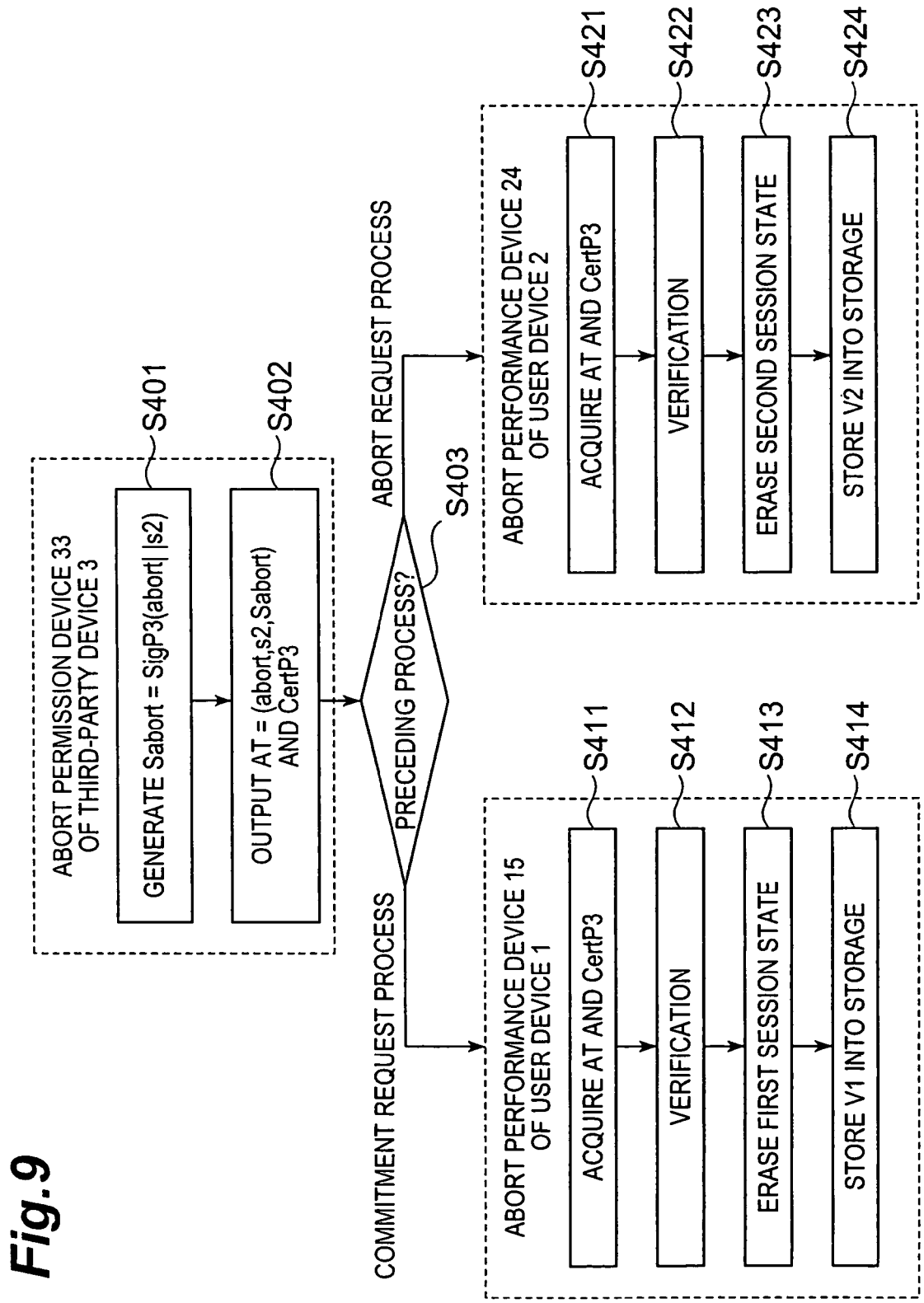
FIG. 9 is an illustration showing a procedure of an abort permission process.

If the third session state is defined as "abort", the flow proceeds to the abort permission process by the abort permission device 33 in FIG. 9 which will be described later.

If the third session state is not defined as "abort", step 306 below is executed.

(step 306) It makes the third session state corresponding to the second session information s2 so as to define the third session state as "commit". For example, as shown in FIG. 11, the third session state is made corresponding to the second session information s2-2 to be defined as "commit". After that, the flow goes to the commitment permission process by the commitment permission device 34 in FIG. 10 which will be described later.

After commitment of the processing according to the above procedure, the commitment request process is terminated.

In the above steps 301, 302, the commitment request device 14 generates the electronic signature Sco for the information containing the second session information s2 and the information Mco indicating the commitment request, using only the second session information s2 contained in the agreement information A, instead of the agreement information A, and outputs the commitment request information Rco being the information containing the second session information s2, the information Mco indicating the commitment request, and the electronic signature Sco; therefore, the transmission/reception can be performed without essentially unnecessary control information, so as to avoid an increase in volume of transmitted and received data and achieve promotion of efficiency of processing.

At the step 306, the commitment determination device 32 makes the third session state corresponding to the second session information s2 so as to define the third session state as "commit"; therefore, the third-party device is able to manage states while appropriately distinguishing a plurality of concurrent electronic value exchanges as shown in FIG. 11.

[Abort Permission Process]

Next, the procedure of the abort permission process, which is executed when one of the predetermined cases is met in the commitment request process or in the abort request process, will be described with reference to FIG. 9.

The abort permission device 33 of the third-party device 3 executes a process below.

(step 401) It generates an electronic signature Sabort=SigP3 (abort∥s2) for information containing information abort indicating an abort permission, and the second session information s2.

(step 402) It outputs abort permission information AT= (abort,s2,Sabort) being information containing the information abort indicating the abort permission, the second session information s2, and the electronic signature Sabort, and the public key certificate CertP3 to the communication means 5.

(step 403) The communication means 5 transfers the abort permission information AT and the public key certificate CertP3 from the third-party device 3 to the user device 1 or to the user device 2. To which the information is to be transferred is determined according to the following conditions.

If the preceding process is the commitment request process, the information is transferred to the user device 1.

If the preceding process is the abort request process, the information is transferred to the user device 2.

When the user device 1 is the one receiving the abort permission information AT and the public key certificate CertP3, the abort performance device 15 of the user device 1 executes a process below.

(step 411) It acquires the abort permission information AT and the public key certificate CertP3 from the communication means 5.

(step 412) It performs a verification on the following items and, if the verification results in a failure even about only one item, it interrupts the subsequent processing.

The first session state is "valid".

The public key certificate CertP3 is a valid public key certificate issued by the third-party device certificate authority.

The electronic signature Sabort=SigP3(abort∥s2) is successfully verified by the public key P3.

(step 413) It erases the first session state or defines it as invalid.

(step 414) It generates an electronic value corresponding to the electronic value V1 and stores it into the storage device 10.

On the other hand, when the user device 2 is the one receiving the abort permission information AT and the public key certificate CertP3, the abort performance device 24 of the user device 2 executes a process below.

(step 421) It acquires the abort permission information AT and the public key certificate CertP3 from the communication means 5.

(step 422) It performs a verification on the following items and, if the verification results in a failure even about only one item, it interrupts the subsequent processing.

The second session state is "hold" or "valid".

The public key certificate CertP3 is a valid public key certificate issued by the third-party device certificate authority.

The electronic signature Sabort=SigP3(abort∥s2) is successfully verified by the public key P3.

(step 423) It erases the second session state or defines it as invalid.

(step 424) It generates an electronic value corresponding to the electronic value V2 and stores it into the storage device 20.

After commitment of the above processing, the abort permission process is terminated.

At the above steps 401, 402, the abort permission device 33 generates the electronic signature Sabort for the information containing the second session information s2 and the information abort indicating the abort permission, using only the second session information s2 contained in the agreement information A, instead of the agreement information A, and outputs the abort permission information AT being the information containing the second session information s2, the information abort indicating the abort permission, and the electronic signature Sabort; therefore, the transmission/reception can be performed without essentially unnecessary control information, so as to avoid an increase in volume of transmitted and received data and achieve promotion of efficiency of processing.

[Commitment Permission Process]

Next, the commitment permission process, which is executed when one of the predetermined cases is met in the commitment request process or in the abort request process, will be described with reference to FIG. 10.

The commitment permission device 34 of the third-party device 3 executes a process below.

(step 501) It generates an electronic signature Scommit=SigP3(commit∥s2) for information containing information commit indicating a commitment permission, and the second session information s2.

(step 502) It outputs commitment permission information CT=(commit,s2,Scommit) being information containing the information commit indicating the commitment permission, the second session information s2, and the electronic signature Scommit, and the public key certificate CertP3 to the communication means 5.

(step 503) The communication means 5 transfers the commitment permission information CT and the public key certificate CertP3 from the third-party device 3 to the user device 1 or to the user device 2. To which the information is to be transferred is determined depending upon the following conditions.

If the preceding process is the commitment request process, the information is transferred to the user device 1.

If the preceding process is the abort request process, the information is transferred to the user device 2.

When the user device 1 is the one receiving the commitment permission information CT and the public key certificate CertP3, the commitment performance device 16 of the user device 1 executes a process below.

(step 511) It acquires the commitment permission information CT and the public key certificate CertP3 from the communication means 5.

(step 512) It performs a verification on the following items and, if the verification results in a failure even about only one item, it interrupts the subsequent processing.

The first session state is "valid".

The public key certificate CertP3 is a valid public key certificate issued by the third-party device certificate authority.

The electronic signature Scommit=SigP3(commit∥s 2) is successfully verified by the public key P3.

(step 513) It erases the first session state or defines it as invalid.

(step 514) It generates an electronic value corresponding to the electronic value V2 and stores it into the storage device 10.

On the other hand, when the user device 2 is the one receiving the commitment permission information CT and the public key certificate CertP3, the commitment performance device 25 of the user device 2 executes a process below.

(step 521) It acquires the commitment permission information CT and the public key certificate CertP3 from the communication means 5.

(step 522) It performs a verification on the following items and, if the verification results in a failure even about only one item, it interrupts the subsequent processing.

The second session state is "hold" or "valid".

The public key certificate CertP3 is a valid public key certificate issued by the third-party device certificate authority.

The electronic signature Scommit=SigP3(commit∥s2) is successfully verified by the public key P3.

(step 523) It erases the second session state or defines it as invalid.

(step 524) It generates an electronic value corresponding to the electronic value V1 and stores it into the storage device 20.

After commitment of the above processing, the commitment permission process is terminated.

At the above steps 501, 502, the commitment permission device 34 generates the electronic signature Scommit for the information containing the second session information s2 and the information commit indicating the commitment permission, using only the second session information s2 contained in the agreement information A, instead of the agreement information A, and outputs the commitment permission information CT being the information containing the second session information s2, the information commit indicating the commitment permission, and the electronic signature Scommit; therefore, the transmission/reception can be performed without essentially unnecessary control information, so as to avoid an increase in volume of transmitted and received data and achieve promotion of efficiency of processing.

In the above embodiment, the electronic values 101, 201 can be electronic money indicating certain amounts of money. This substantializes an electronic currency exchange system. Furthermore, an electronic ticket sales system can be substantialized by a configuration wherein the electronic value 101 is one or more electronic tickets and wherein the electronic value 201 is electronic money representing a certain amount of money or by a configuration wherein the electronic value 201 represents one or more electronic tickets and the electronic value 101 electronic money representing a certain amount of money.

Programs to execute the processes of the present embodiment in the respective devices of the system in the present embodiment can be recorded, stored, or distributed in computer-readable recording media, e.g., FD (flexible disk), MO, ROM, a memory card, CD-ROM, DVD, a removable disk, or the like. The programs can also be provided through a network, such as the Internet or e-mail.

It is noted that the present invention is not limited to the above embodiments and that a variety of changes and applications can be made within the scope of the claims.

The disclosure of Japanese Patent Application No. 2005-071690 filed Mar. 14, 2005 including specification, drawings and claims is incorporated herein by reference in its entirety.

What is claimed is:

1. A method of exchanging a first electronic value stored in a first user device, for a second electronic value stored in a second user device, the method comprising:
   transmitting, from the first user device, the first electronic value stored in the first user device and offer information;
   receiving the first electronic value and the offer information in the second user device;
   transmitting, from the second user device, the second electronic value stored in the second user device and agreement information, the agreement information includes agreement object information, session information, and an agreement electronic signature;
   receiving the second electronic value and the agreement information in the first user device;
   determining whether there is an abnormality in exchanging data between the first and second user devices;
   generating, after it is determined that there is an abnormality by said determining, a first electronic signature based on the session information and abnormality information;
   transmitting, after it is determined that there is an abnormality by said determining, abnormality request information to a third device to determine whether exchanging electronic values between the first and second user devices is to be aborted or committed, the abnormality request information includes the abnormality information, the session information, and the first electronic signature, and does not include control information, thereby information is transmitted to the third device without unnecessary control information;
   transmitting, after it is determined at the third device that the exchange of electronic values is to be aborted, from the third device information indicating that the exchange of electronic values is to be aborted; and
   transmitting, after it is determined at the third device that the exchange of electronic values is to be committed, from the third device information indicating that the exchange of electronic values is to be committed.

2. The method of claim 1, further comprising
   receiving, at the third device, information including the abnormality request information;
   verifying, at the third device, the information received at the third device;
   determining, at the third device, a session state, the session state corresponding to the session information included in the abnormality request information; and
   setting, after a predetermined state is determined, at the third device the session state based on the session information, thereby the third device is able to manage states while appropriately discriminating a plurality of concurrent electronic value exchanges.

3. The method of claim 2, wherein after the abnormality request information indicates an abort request and the session state is not defined as commit, setting the session state as abort, and after the abnormality request information indicates a commitment request and the session state is not defined as abort, setting the session state as commit.

4. The method of claim 1, wherein said step of transmitting from the third device information indicating that the exchange of electronic values is to be aborted includes:
   generating, at the third device, a second electronic signature based on only the session information and abort permission information, and
   transmitting abort permission output information from the third device, the abort permission output information includes the abort permission information, the session information, and the second electronic signature, and does not include control information, so that the information transmitted from the third device does not contain unnecessary control information.

5. The method of claim 4, further comprising:
   receiving information including the abort permission output information from the third device; and
   verifying the information received.

6. The method of claim 1, wherein the step of transmitting from the third device information indicating that the exchange of electronic values is to be committed includes:
   generating at the third device a second electronic signature based on only the session information and the commitment permission information, and
   transmitting commitment permission output information, the commitment permission output information includes the commitment permission information, the session information, and the second electronic signature, and does not include control information, thereby the information transmitted from the third device does not contain unnecessary control information.

7. The method of claim 6, further comprising:
   receiving information including the commitment permission output information from the third device; and
   verifying the information received.

8. The method of claim 1, wherein determining whether there is an abnormality in exchanging data includes determining that an abnormality does exist after the communication channel between the first and second user devices is not functioning.

9. The method of claim 1, wherein determining whether there is an abnormality in exchanging data includes determining that an abnormality does exist after it is verified that information sent to the first or second user device corresponds to invalid information.

10. The method of claim 1, wherein determining whether there is an abnormality in exchanging data includes determining that an abnormality does exist after a transmission from the first or second user device is not carried out within a fixed time.

11. The method of claim 1, wherein the information indicating that the exchange of electronic values is to be aborted further indicates that an electronic value is to be stored in the original location of the electronic value.

12. The method of claim 1, wherein the information indicating that the exchange of electronic values is to be committed further indicates that an exchanged electronic value is to be stored in a receiving user device.

13. The method of claim 1, wherein the third device determines whether exchanging electronic values between the first and second user devices is to be aborted or committed based on a session state corresponding to the session information.

14. The method of claim 1, wherein the first electronic signature is generated based on only the session information and abnormality information.

* * * * *